Figure 1:
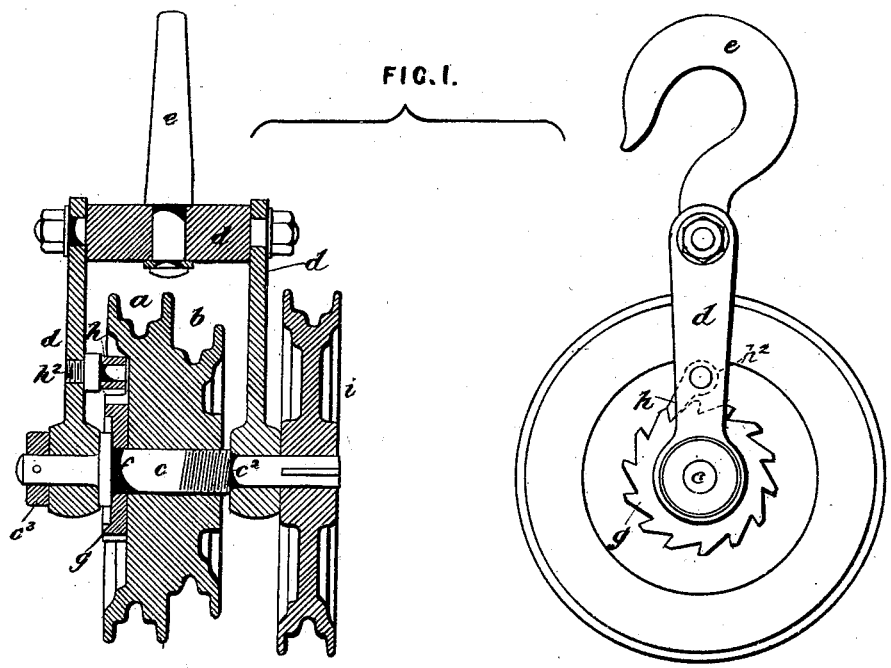

(No Model.) 7 Sheets—Sheet 1.
T. H. WARD & E. HOWL.
PULLEY BLOCK.

No. 268,323. Patented Nov. 28, 1882.

FIG. I.

(No Model.) T. H. WARD & E. HOWL. 7 Sheets—Sheet 2.
PULLEY BLOCK.

No. 268,323. Patented Nov. 28, 1882.

Witnesses
James F. Tobin
Harry Drury

Inventors
Thomas H. Ward
and
Edmund Howl
by their Attorneys (No Model.) T. H. WARD & E. HOWL. 7 Sheets—Sheet 3.
PULLEY BLOCK.

No. 268,323. Patented Nov. 28, 1882.

Witnesses
James F Tobin
Harry Drury

Inventors
Thomas H Ward
and
Edmund Howl
by their Attorneys
Howsm and Jons (No Model.) 7 Sheets—Sheet 4.
T. H. WARD & E. HOWL.
PULLEY BLOCK.

No. 268,323. Patented Nov. 28, 1882.

Witnesses
James F. Tobin
Harry Drury

Inventors
Thomas H. Ward
and
Edmund Howl
by their Attorneys
Howson and Son (No Model.) 7 Sheets—Sheet 6.

T. H. WARD & E. HOWL.
PULLEY BLOCK.

No. 268,323. Patented Nov. 28, 1882.

Witnesses
James F. Tobin
Jas. L. Skidmore

Inventors
Thomas H. Ward
and
Edmund Howl
by their Attorneys
Howsen and Son (No Model.) T. H. WARD & E. HOWL. 7 Sheets—Sheet 7.
PULLEY BLOCK.

No. 268,323. Patented Nov. 28, 1882.

Witnesses
James T Tobin
Harry Drury

Inventors
Thomas H Ward
and
Edmund Howl
by their Attorneys
Howsen and Son

UNITED STATES PATENT OFFICE.

THOMAS H. WARD AND EDMUND HOWL, OF TIPTON, COUNTY OF STAFFORD, ENGLAND.

PULLEY-BLOCK.

SPECIFICATION forming part of Letters Patent No. 268,323, dated November 28, 1882.

Application filed May 26, 1882. (No model.) Patented in England September 17, 1881, No. 4,012.

*To all whom it may concern:*

Be it known that we, THOMAS HENRY WARD and EDMUND HOWL, (of the firm of HOWL, WARD & HOWL,) subjects of the Queen of Great Britain, and residing respectively at Tipton, in the county of Stafford, England, have invented certain Improvements in Pulley-Blocks, parts of which improvements are also applicable to cranes, overhead travelers, hoists, and other like apparatus, (for which we have obtained a patent in Great Britain, No. 4,012, dated 17th September, 1881,) of which the following is a specification.

Our invention relates to improvements in pulley-blocks, parts of which are also applicable to cranes, overhead travelers, hoists, and other like apparatus, and it has reference more particularly to differential pulley-blocks constructed somewhat after the manner of those known as "Weston's" pulley-blocks; but the object of our invention is to produce a pulley-block which shall have the advantages of a Weston pulley-block combined with a more efficient lowering-gear, whereby we obtain a Weston's differential block, self-sustained only when required, which shall be capable of being lowered, not by the effort of gravity direct, (which necessitates reliance upon a powerful brake-gear to arrest the descent of the load,) but by the differential effort only, and consequently having a speed much slower and much safer, due to that differential or retarded gravity.

In order to accomplish the object before mentioned, we employ a block complete, with chain and top and bottom sheaves, after the manner of a Weston pulley; but the said top sheaves have their relative diameters proportioned so that the mechanical efficiency is slightly greater than the friction—say, for example, the ratio of the diameters of the sheaves is as six is to five—thus constituting a block which is not self-sustained.

In order that our said invention may be fully understood, we shall now proceed more particularly to describe the same, and for that purpose shall refer to the several figures on the annexed sheet of drawings, the same letters of reference indicating corresponding parts in all the figures.

Figure 1 represents, in side elevation and transverse vertical section, the top sheaves of a pulley-block constructed according to our invention. The two sheaves $a$ and $b$ are cast or formed in one, or are rigidly connected together after the manner of the sheaves of a Weston pulley-block; but the sheave $b$ is of such diameter relatively with the diameter of the sheave $a$ that, instead of the load being self-sustaining, it is only partly so, or, in other words, the mechanical efficiency or the action of the force of gravity is slightly greater than the friction. The shaft or axle $c$ of the sheaves is carried in bearings in the frame $d$, which carries the hook or shackle $e$. The axle $c$ has a collar, $f$, thereon, and is screwed at $c^2$ with a quick thread taking into a female screw in the sheave, which thus serve as a nut, which is screwed onto the shaft from the end opposite the collar $f$. Between the sheave $a$ and the collar $f$ a ratchet-wheel, $g$, is threaded onto the shaft $c$, the said ratchet-wheel being provided with a detent, $h$, mounted upon a pin, $h^2$, carried by the frame $d$, the teeth of the said ratchet-wheel facing in such a direction that although the said wheel is free to rotate in the direction for raising the load as in a Weston pulley-block, yet it is prevented by the detent $h$ from rotating in the opposite direction. The thread of the screw $c^2$ should be as quick as possible so long as it is sufficient to pick up the load; otherwise, if it is too slow, it will be difficult to release it in lowering the load. The nut $c^3$ prevents the longitudinal movement of the shaft $c$. A sprocket-wheel, $i$, is keyed to the shaft, over which sprocket-wheel the operating-chain is passed. It will be seen that the shaft $c$ represents a screwed bolt, the collar $f$ constituting its head, the sheaves $a$ and $b$ its nut, and the sprocket-wheel a lever; and if the bolt is rotated by this sprocket-wheel in the direction of raising, as in a Weston pulley-block, it will be equivalent to rotating a screwed bolt inside its nut. Consequently this nut (the said sheaves $a$ and $b$) will grip the ratchet-wheel $g$ tightly between it and the bolt-head, (the collar $f$,) and all four—videlicet, the lever or sprocket-wheel $i$, the bolt or axle $c$, the ratchet-wheel $g$, and the nut or sheaves $a$ $b$—will by their frictional bearing rotate together in raising the load, and since the detent $h$ prevents the ratchet-wheel $g$ from running back again, then, until the bolt or axle $c$ has been unscrewed again, it remains suspended as a self-sustained block. When the lever or sprocket-wheel $i$ is rotated in the opposite direction—that is, in the direction necessary for unscrewing the bolt or axle $c$ out of its nut, (the sheaves $a\ b$)—the ratchet-wheel $g$ is released from its frictional bearing against the said sheaves, and since the said sheaves, which were previously prevented from turning by the friction of this ratchet-wheel gripping it, are once more free to rotate, they will again run forward upon the screw to grip or pinch against the ratchet-wheel again unless the bolt or axle $c$ is being at the same time and at the same speed rotated in the direction of unscrewing, which will be done by the person lowering the load at such a rate as to compensate for this tendency of the sheaves to grip or pinch against the said ratchet-wheel $g$. Therefore in order to lower a load it requires attention, but not labor. According to another modification of the said invention, we utilize the sprocket-wheel instead of the sheaves as a nut, thereby gripping both the ratchet-wheel and the sheaves between head and nut. In this case, however, it will be seen that after releasing by the nut (which is also a lever) the load will continue to descend until this nut is screwed up again.

Figure 2:
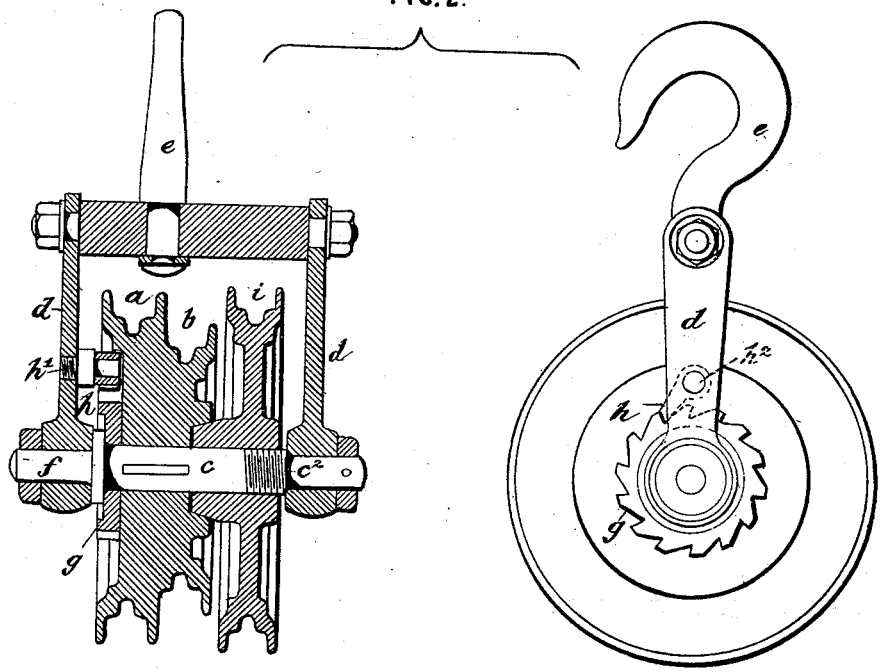

Fig. 2 represents in side elevation and transverse vertical section this modification. The parts which correspond to the like parts in Fig. 1 are marked with the same letters of reference. The sprocket-wheel $i$ is upon the shaft $c$, and the screw $c^2$ engages in a female screw in the boss of the said sprocket-wheel, which boss has also a frictional bearing upon or in the boss of the sheaves. The action, it will readily be seen, is analogous to that described with regard to Fig. 1, the rotation of the sprocket-wheel in one direction causing it to run upon the screw $c^2$, grip the sheaves $a\ b$ and ratchet-wheel $g$ between itself and the collar $f$, and the reverse rotation releasing this grip for lowering the load.

Figure 3:
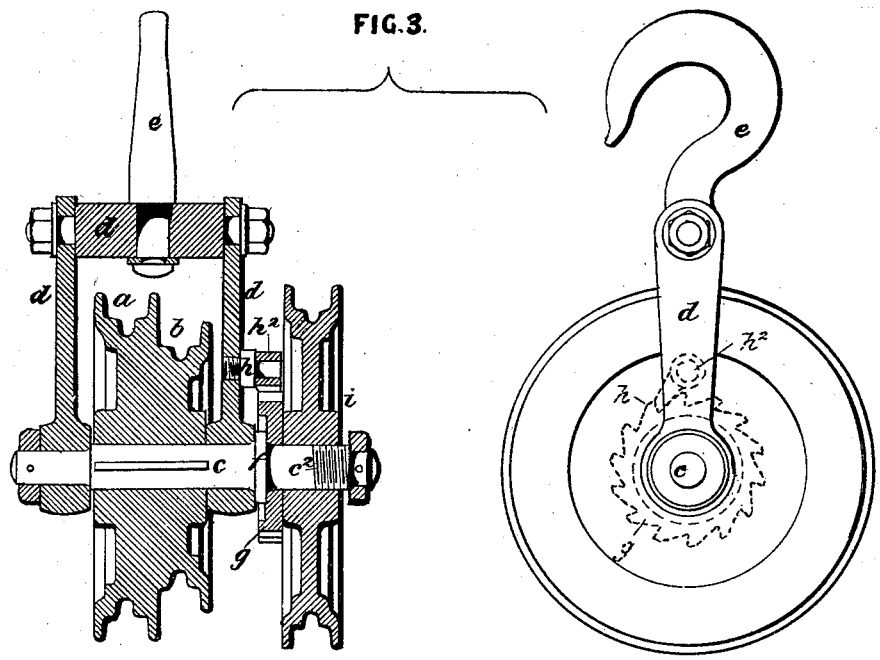

Fig. 3 represents in side elevation and transverse vertical section a modification of the arrangement shown in Fig. 2, the sprocket-wheel $i$, as in that arrangement, forming both the nut and the lever at the same time; but the said nut only grips the ratchet-wheel $g$ between itself and the collar $f$, the twin sheaves $a\ b$ being keyed on the shaft $c$, which shaft is arrested when the wheel $i$ is turned in the direction for raising a load by the frictional bearing of the ratchet-wheel upon the collar $f$. The parts are marked with the same letters which are used to denote the like parts in the preceding figures. According to another modification of the last-described arrangements, we cast the sheaves $a\ b$ separate, and keyed one at each end of the axle $c$, with the sprocket-wheel $i$, ratchet-wheel $g$, and its bearing-surface between, this arrangement allowing of the sheaves being outside the frame and the sprocket-wheel between, in vertical line with the load, to give the advantage of a central pull of the actuating-chain.

Figure 4:
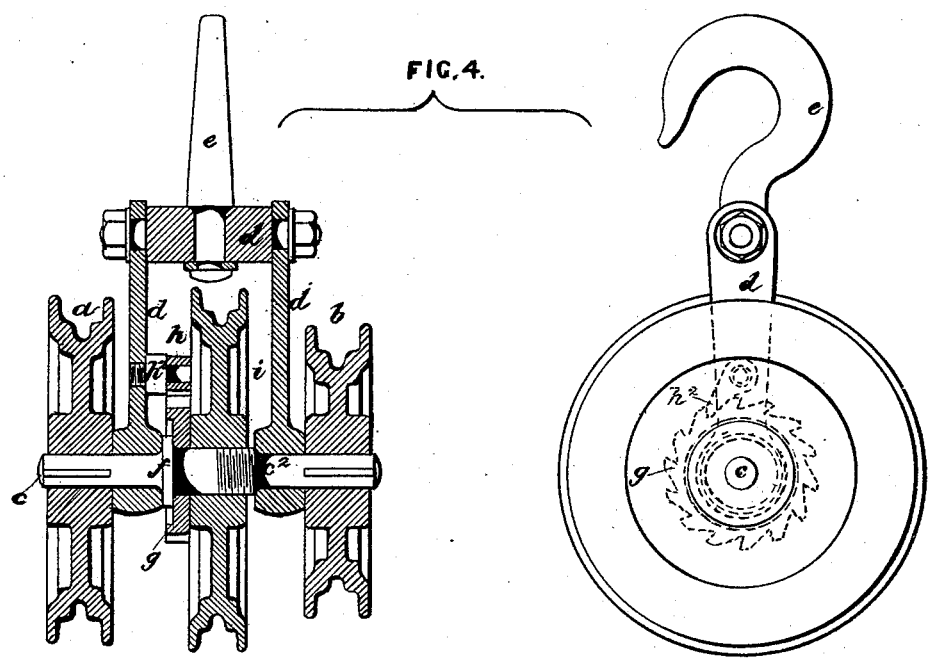

Fig. 4 shows the last-named modification in side elevation and transverse vertical section, wherein the parts are marked with the same letters as are used to denote like parts in the other figures. The sheaves $a\ b$ are keyed to the ends of the axle $c$, which project beyond the frame $d$. The sprocket-wheel $i$, as in the arrangements Figs. 2 and 3, forms the nut for pinching or tightening and releasing the sprocket-wheel. The action of the parts is essentially similar to the action explained with regard to the preceding arrangements, and will be readily understood without further description. Modifications of the above may be made for heavier loads by adding another shaft, which is rotated and drives by gear the main shaft or axle $c$, in which case either the sheaves or the pinion can be gripped by the ratchet, as most suitable.

Figure 5:
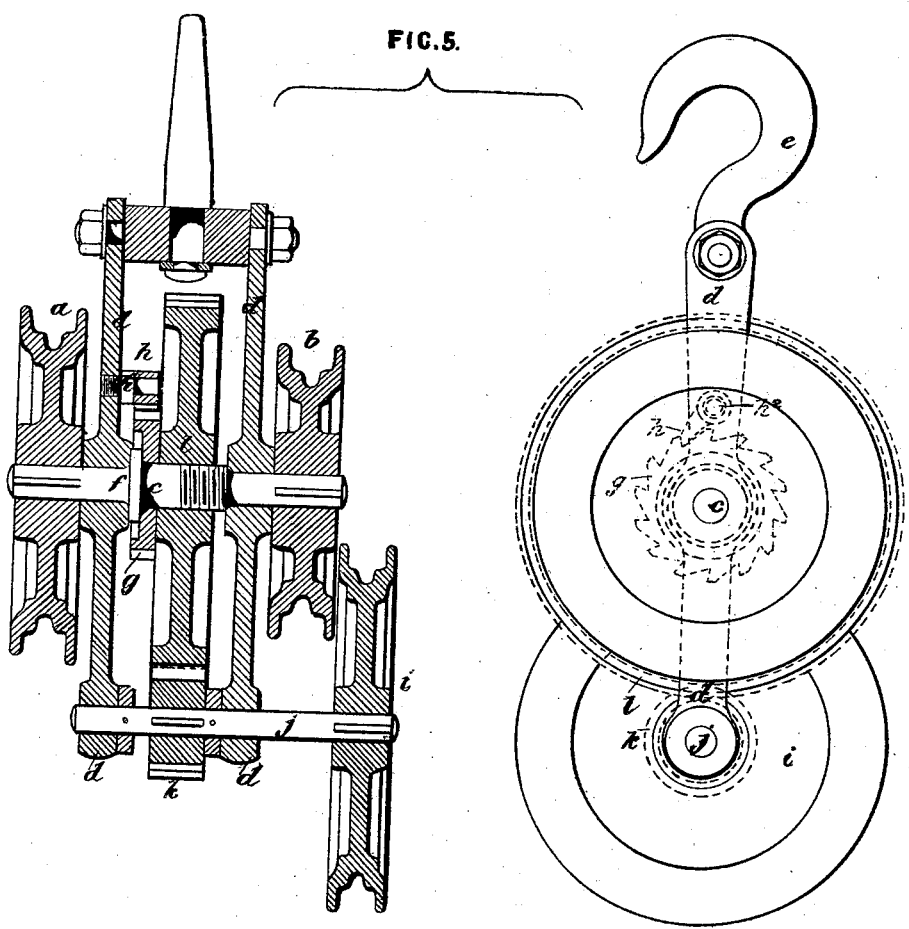

Fig. 5 represents in side elevation and transverse vertical section an arrangement according to this last-mentioned modification, wherein parts which are like those in the preceding figures are marked with the same letters of reference. This modification (Fig. 5) is similar in general arrangement to that shown in Fig. 4; but in place of the nut which runs upon the screw $c^2$ being in the boss of the sprocket-wheel it is in the toothed wheel $l$, which takes the place of the said sprocket-wheel, which is keyed to a shaft, $j$, turning in bearings in extension of the framing $d$. The said shaft carries a pinion, $k$, revolving therewith. It will readily be seen that this arrangement only differs in its general arrangement and action from those before described in the matter of gain of power at the expense of speed.

Figure 6:
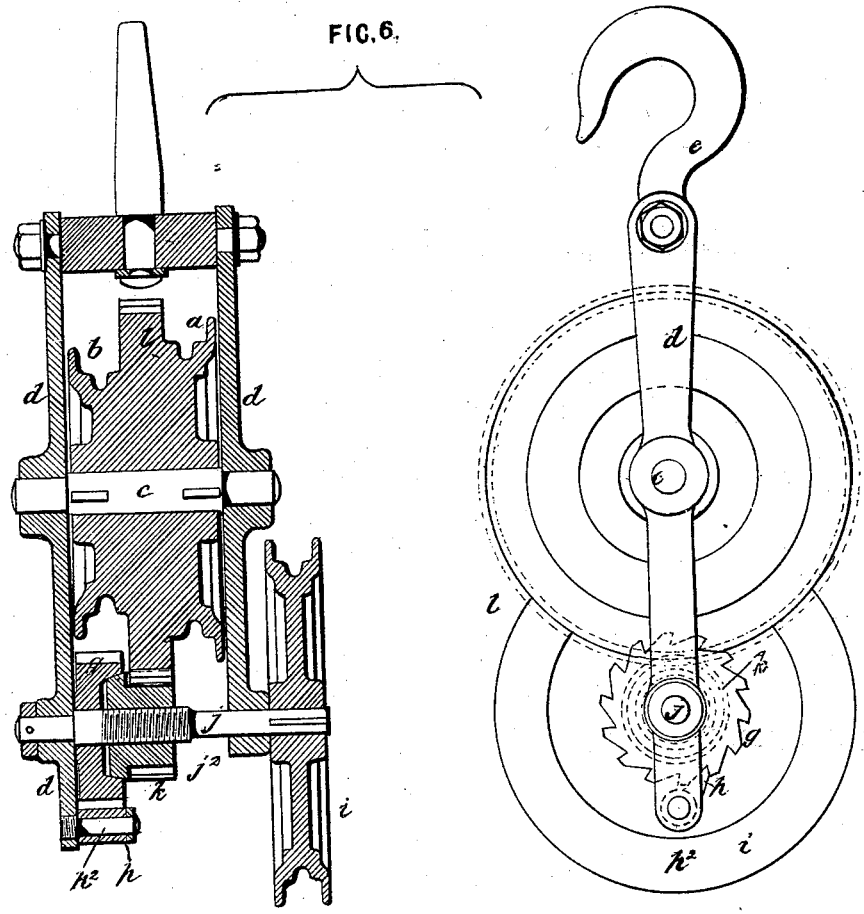
Figure 7:
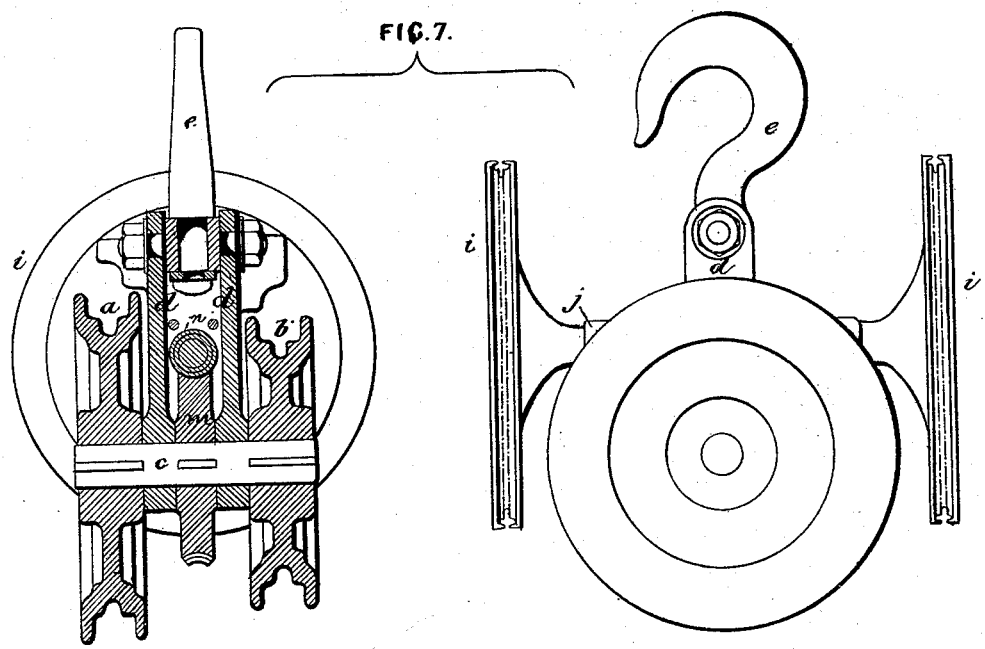

Fig. 6 represents similar views of an arrangement according to this last modification, wherein the supplementary shaft $j$ carries the screw $j^2$—the equivalent of $c^2$—the pinion $k$ constituting the nut for running in one or other direction on the said screw for gripping the ratchet-wheel $g$ by frictional contact with itself and the continuation of the frame $d$. In this arrangement (Fig. 6) the sheaves $a$ and $b$ are shown as being cast in one with the toothed wheel $l$. It will be readily understood that the principle of action is the same as in the preceding arrangements, and we have marked in this figure the parts which correspond to those in the other figures with like letters of reference. According to another modification of the last, which is adapted for very heavy loads, a worm-wheel actuated by a worm is driven by one or more sprockets, and is in contact with the ratchet-wheel on either one shaft or other. Fig. 7 is a diagram illustrating this arrangement. The sheaves are shown at $a\ b$, and keyed to the shaft $c$ is the worm-wheel $m$, with which gears the worm $n$, which is the equivalent of the pinion $k$ in the arrangements shown in Fig. 6, and is on a shaft, $j$, carrying the ratchet-wheel $g$, as in the said Fig. 6.

In the three modifications last hereinbefore described the power is applied or conveyed to the axle $c$ centrally, so that the block is perfectly balanced.

Although we have described our invention as applied to the top sheaves of pulleys, yet it will be readily understood that like applications of our arresting-gear may be made, where suitable or desirable, to the bottom sheave instead of the top sheaves, provided that the top or differential sheaves are proportioned, as before described, so that the whole of the load is not self-sustained. Other suitable break-gears may also be employed—such, for example, as a brake-strap—for arresting the differential effort of gravity, and not the direct effort itself, whether applied either to the top or bottom sheaves. In this case the top sheaves are proportioned as hereinbefore described with regard to the twin sheaves $a$ $b$—that is to say, the one sheave is not so near the diameter of the other as to render the pulley-block self-sustaining, but is so proportioned that the gravitation of the load is to some extent in excess of the power of retention exerted by the friction. In place of the screw $c^2$ and the ratchet-wheel $g$, a brake is employed, which may be either a brake-strap or a brake-lever, to be brought to bear upon a friction-pulley or the like upon the shaft $c$, to which the twin sheaves are keyed, or upon the axis of the lower sheave, in order to restrain or prevent the descent of the load. This is very readily effected by these means, owing to the fact that only a small portion of the load—to the extent to which the mechanical equivalent or gravitation of the load exceeds the friction—has to be arrested by the said brake.

It will be readily understood that some of the arrangements hereinbefore described can be with advantage applied to cranes and to or as overhead travelers or hoists, and the like. For example, the arrangement Fig. 4 is well adapted for a crane, and the arrangement Fig. 3 can be readily adapted as or to a hoist by arranging the bearings of the shaft $c$ in convenient standards or brackets.

We claim as our invention—

The combination of the sheaves of a differential pulley having substantially the relative proportions herein described, for the purpose set forth, with friction devices for arresting or retarding the descent of the load.

In witness whereof we have signed our names to this specification in the presence of two subscribing witnesses.

T. H. WARD.
EDMUND HOWL.

Witnesses:
 F. BRAME,
  *U. S. Consulate, Birm.*,
 JOHN M. DICKINSON,
  *U. S. Consulate, Birmingham.*